United States Patent
Chen et al.

(10) Patent No.: US 11,902,506 B2
(45) Date of Patent: Feb. 13, 2024

(54) VIDEO ENCODER, VIDEO DECODER, AND CORRESPONDING METHODS

(71) Applicant: HUAWEI TECHNOLOGIES CO., LTD., Guangdong (CN)

(72) Inventors: Huanbang Chen, Shenzhen (CN); Yin Zhao, Hangzhou (CN); Haitao Yang, Shenzhen (CN); Lian Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/374,004

(22) Filed: Jul. 13, 2021

(65) Prior Publication Data

US 2021/0344899 A1 Nov. 4, 2021

Related U.S. Application Data

(63) Continuation of application No. PCT/CN2019/127237, filed on Dec. 21, 2019.

(30) Foreign Application Priority Data

Jan. 14, 2019 (CN) .................. 201910033419.X
Apr. 24, 2019 (CO) .................. 201910335981.8

(51) Int. Cl.
*H04N 19/103* (2014.01)
*H04N 19/50* (2014.01)
*H04N 19/96* (2014.01)

(52) U.S. Cl.
CPC .......... *H04N 19/103* (2014.11); *H04N 19/50* (2014.11); *H04N 19/96* (2014.11)

(58) Field of Classification Search
CPC ....... H04N 19/103; H04N 19/50; H04N 19/96
See application file for complete search history.

(56) References Cited

U.S. PATENT DOCUMENTS

2012/0114040 A1  5/2012  Shmueli et al.
2016/0269730 A1  9/2016  Jeon et al.
2016/0373741 A1* 12/2016  Zhao ...................... H04N 19/70
(Continued)

FOREIGN PATENT DOCUMENTS

AU   2006201490 A1    11/2006
AU   2013268588 A1 *   5/2013
(Continued)

OTHER PUBLICATIONS

Lee, Jin-Young translation of WO-2019009504, Jan. 2019 (Year: 2019).*
Ikai Tomohiro, translation of JP-2020504506, May 2013 (Year: 2013).*
Ikai T translation of AU-2013268588 Jan. 2015 (Year: 2015).*
(Continued)

*Primary Examiner* — Zaihan Jiang
(74) *Attorney, Agent, or Firm* — WOMBLE BOND DICKINSON (US) LLP

(57) ABSTRACT

This application discloses a processing method applied to video encoding or video decoding. The method includes: obtaining size information of a current block; determining a context model index ctxInc of a flag of the current block based on the obtained size information of the current block and a size-based constraint; and performing subsequent processing based on the context model index ctxInc of the flag of the current block. The method can be used to improve coding efficiency.

18 Claims, 7 Drawing Sheets

(56) References Cited

U.S. PATENT DOCUMENTS

| | | | | |
|---|---|---|---|---|
| 2016/0373742 | A1* | 12/2016 | Zhao | H04N 19/136 |
| 2016/0373743 | A1* | 12/2016 | Zhao | H04N 19/593 |
| 2016/0373769 | A1* | 12/2016 | Zhao | H04N 19/176 |
| 2016/0373770 | A1* | 12/2016 | Zhao | H04N 19/593 |
| 2017/0280147 | A1* | 9/2017 | Yu | H04N 19/91 |
| 2017/0332095 | A1 | 11/2017 | Zou et al. | |
| 2018/0332288 | A1 | 11/2018 | Hsiang et al. | |
| 2018/0338144 | A1 | 11/2018 | Nam et al. | |

FOREIGN PATENT DOCUMENTS

| | | | | |
|---|---|---|---|---|
| AU | 2013268588 A1 * | 1/2015 | | H04N 19/117 |
| CN | 103650510 A | 3/2014 | | |
| CN | 104094605 A | 10/2014 | | |
| CN | 104853200 A | 8/2015 | | |
| CN | 106688238 A | 5/2017 | | |
| CN | 107534711 A | 1/2018 | | |
| CN | 107911699 A | 4/2018 | | |
| CN | 108293109 A | 7/2018 | | |
| CN | 108605130 A | 9/2018 | | |
| CN | 109155855 A | 1/2019 | | |
| EP | 2696582 A2 | 2/2014 | | |
| JP | 2020504506 A * | 5/2013 | | |
| JP | 2020504506 A * | 1/2018 | | |
| JP | 2020504506 A * | 1/2018 | | |
| KR | WO 2019009504 A1 * | 3/2018 | | |
| WO | 2015096093 A1 | 7/2015 | | |
| WO | 2017088170 A1 | 6/2017 | | |
| WO | 2017088810 A1 | 6/2017 | | |
| WO | 2018080122 A1 | 5/2018 | | |
| WO | 2018128380 A1 | 7/2018 | | |
| WO | WO-2019009504 A1 * | 1/2019 | | H04N 19/105 |

OTHER PUBLICATIONS

Lee (Samsung) T et al., CE1 subtest A: Line buffer removal for CU split flag context model, 7. JCT-VC Meeting; Nov. 21, 2011-Nov. 30, 2011; Geneva; (Joint Collaborative Team on Video Coding of ISO/IEC JTC1/SC29/WG11 and ITU-T SG.16 ),No. JCTVC-G769 Nov. 21, 2011, total 5 pages. XP030230419.

Document: JVET-L0361-v4, Yin Zhao et al., CEI-related: Context modeling of CU split modes, Joint Video Experts Team (JVET) of ITU-T SG 16 WP 3 and ISO/IEC JTC 1/SC 29/WG11, 12th Meeting: Macao, CN, Oct. 3-12, 2018, total 6 pages. XP030195297.

Xiao Chuang-bai,Wu Peng, Adaptive Fast Multi-frame Selection Algorithm for H.264/AVC, Journal of Beijing University of Technology, 2009, Issue 04, with an English Abstract, 6 pages.

Yin Zhao et al., CE1-related: Context modeling of CU split modes, Joint Video Experts Team (JVET) of ITU-T SG 16 WP 3 and ISO/IEC JTC 1/SC 29/WG 11, 12th Meeting: Macao, CN, Oct. 3-12, 2018, total 6 pages.

ITU-T H.261 (Mar. 1993), Line Transmission of Non-Telephone Signals, Video Codec for Audiovisual Services At p x 64 kbits, total 29 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

B. Bross et al.,"Versatile Video Coding (Draft 3)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1001-v9,total: 235 pages.

* cited by examiner

VIDEO ENCODER, VIDEO DECODER, AND CORRESPONDING METHODS

CROSS-REFERENCE TO RELATED APPLICATIONS

This application is a continuation of International Application No. PCT/CN2019/127237, filed on Dec. 21, 2019, which claims priority to Chinese Patent Application No. 201910033419.X, filed on Jan. 14, 2019 and Chinese Patent Application No. 201910335981.8, filed on Apr. 24, 2019. The disclosures of the aforementioned applications are hereby incorporated by reference in their entireties.

TECHNICAL FIELD

The present disclosure relates to the field of video coding technologies, and in particular, to a video encoder, a video decoder, and corresponding methods.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards including MPEG-2, MPEG-4, ITU-T H.263, and ITU-T H.264/MPEG-4 part 10 advanced video coding (AVC), the video coding standard H.265/high efficiency video coding (HEVC) standard, and extensions of these standards. The video apparatuses can transmit, receive, encode, decode, and/or store digital video information more efficiently by implementing the video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into several picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. A picture may be referred to as a frame, and a reference picture may be referred to as a reference frame.

SUMMARY

Embodiments of this application provide a video encoder, a video decoder, and corresponding methods, to improve entropy coding performance to some extent, thereby improving coding performance.

According to a first aspect, an embodiment of this application provides a processing method applied to video encoding or video decoding. The method includes: obtaining size information of a current block; determining a context model index ctxInc of a flag of the current block based on the obtained size information of the current block and a size-based constraint; and performing subsequent processing based on the context model index ctxInc of the flag of the current block.

In an embodiment, when the flag of the current block is skip_flag, the obtained size information of the current block includes an area of the current block, where the flag skip_flag is used to indicate whether a skip mode is used for the current block; and
   the determining a context model index ctxInc of a flag of the current block based on the obtained size information of the current block and a size-based constraint includes:
   if the area sizeC of the current block is less than a threshold th1, determining that a value of the context model index ctxInc used by the flag skip_flag is 3.

In an embodiment, when the flag of the current block is inter_dir, the obtained size information of the current block includes the area of the current block, where the flag inter_dir is used to indicate a prediction reference mode used for the current block; and
   the determining a context model index ctxInc of a flag of the current block based on the obtained size information of the current block and a size-based constraint includes:
   if the area sizeC of the current block is less than the threshold th1, determining that the value of the context model index ctxInc used by the flag inter_dir is 2.

In an embodiment, when the flag of the current block is direct_flag, the obtained size information of the current block includes the area of the current block, or a width of the current block, or a height of the current block, where the flag direct_flag is used to indicate whether a direct mode is used for the current block; and
   the determining a context model index ctxInc of a flag of the current block based on the obtained size information of the current block and a size-based constraint includes:
   if the area sizeC of the current block is less than the threshold th1, or the width of the current block is greater than a threshold th2, or the height of the current block is greater than a threshold th2, determining that the value of the context model index ctxInc used by the flag direct_flag is 1.

In an embodiment, when the flag of the current block is pred_mode, the obtained size information of the current block includes the width of the current block or the height of the current block, where the flag pred_mode is used to indicate whether an intra prediction mode is used for the current block; and
   the determining a context model index ctxInc of a flag of the current block based on the obtained size information of the current block and a size-based constraint includes:
   if the width of the current block is greater than a threshold th3, or the height of the current block is greater than a threshold th3, determining that the value of the context model index ctxInc used by the flag pred_mode is 5.

In an embodiment, when the flag of the current block is root_cbf, the obtained size information of the current block includes the width of the current block or the height of the current block, where the flag root_cbf is used to indicate whether there is a residual after the current block is coded; and the determining a context model index ctxInc of a flag of
the current block based on the obtained size information of the current block and a size-based constraint includes:
if the width of the current block is greater than the threshold th3, or the height of the current block is greater than the threshold th3, determining that the value of the context model index ctxInc used by the flag bit root_cbf is 1.

In an embodiment, when the flag of the current block is qt_split_flag, the obtained size information of the current block includes the width of the current block and the height of the current block, where the flag qt_split_flag is used to indicate whether quadtree split is used for the current block; and
the determining a context model index ctxInc of a flag of the current block based on the obtained size information of the current block and a size-based constraint includes:
if a picture region in which the current block is located is an I slice or an I frame, and the width of the current block is th4, determining that the value of the context model index ctxInc used by the flag qt_split_flag is 3.

In an embodiment, when the flag of the current block is split_dir, the obtained size information of the current block includes the width of the current block and the height of the current block, where the flag split_dir is used to indicate a split direction of the current block; and
the determining a context model index ctxInc of a flag of the current block based on the obtained size information of the current block and a size-based constraint includes:
if the width of the current block corresponding to a current to-be-split node is a threshold th5, and the height of the current block is greater than the threshold th5, determining that the value of the context model index ctxInc used by the flag split_dir is 3; or
if the height of the current block corresponding to a current to-be-split node is a threshold th5, and the width of the current block is greater than the threshold th5, determining that the value of the context model index ctxInc used by the flag split_dir is 4.

According to a second aspect, an embodiment of this application provides a processing apparatus used in video encoding or video decoding. The apparatus includes:
an obtaining unit, configured to obtain size information of a current block;
a determining unit, configured to determine a context model index ctxInc of a flag of the current block based on the obtained size information of the current block and a size-based constraint; and
a processing unit, configured to perform subsequent processing based on the context model index ctxInc of the flag of the current block.

In an embodiment, when the flag of the current block is skip_flag, the size information, obtained by the obtaining unit, of the current block includes an area of the current block; and
the determining unit is further configured to: when determining that the area sizeC of the current block is less than a threshold th1, determine that a value of the context model index ctxInc used by the flag skip_flag is 3.

In an embodiment, when the flag of the current block is inter_dir, the size information, obtained by the obtaining unit, of the current block includes the area of the current block; and the determining unit is further configured to: when the area sizeC of the current block is less than the threshold th1, determine that the value of the context model index ctxInc used by the flag inter_dir is 2.

In an embodiment, when the flag of the current block is direct_flag, the size information, obtained by the obtaining unit, of the current block includes the area of the current block, or a width of the current block, or a height of the current block, where the flag direct_flag is used to indicate whether a direct mode is used for the current block; and
the determining unit is further configured to: when the area sizeC of the current block is less than the threshold th1, or the width of the current block is greater than a threshold th2, or the height of the current block is greater than a threshold th2, determine that the value of the context model index ctxInc used by the flag direct_flag is 1.

In an embodiment, when the flag of the current block is pred_mode, the size information, obtained by the obtaining unit, of the current block includes the width of the current block or the height of the current block, where the flag pred_mode is used to indicate whether an intra prediction mode is used for the current block; and
the determining unit is further configured to: when the width of the current block is greater than a threshold th3, or the height of the current block is greater than a threshold th3, determine that the value of the context model index ctxInc used by the flag pred_mode is 5.

In an embodiment, when the flag of the current block is root_cbf, the size information, obtained by the obtaining unit, of the current block includes the width of the current block or the height of the current block, where the flag root_cbf is used to indicate whether there is a residual after the current block is coded; and
the determining unit is further configured to: when the width of the current block is greater than the threshold th3, or the height of the current block is greater than the threshold th3, determine that the value of the context model index ctxInc used by the flag root_cbf is 1.

In an embodiment, when the flag of the current block is qt_split_flag, the size information, obtained by the obtaining unit, of the current block includes the width of the current block and the height of the current block, where the flag qt_split_flag is used to indicate whether quadtree split is used for the current block; and
the determining unit is further configured to: when a picture region in which the current block is located is an I slice or an I frame, and the width of the current block is th4, determine that the value of the context model index ctxInc used by the flag qt_split_flag is 3.

In an embodiment, when the flag of the current block is split_dir, the size information, obtained by the obtaining unit, of the current block includes the width of the current block and the height of the current block, where the flag split_dir is used to indicate a split direction of the current block; and
the determining unit is further configured to: when the width of the current block corresponding to a current to-be-split node is a threshold th5, and the height of the current block is greater than the threshold th5, determine that the value of the context model index ctxInc used by the flag split_dir is 3; or
when the height of the current block corresponding to a current to-be-split node is a threshold th5, and the width of the current block is greater than the threshold th5, determine that the value of the context model index ctxInc used by the flag split_dir is 4.

According to a third aspect, an embodiment of this application provides a processing method applied to video encoding or video decoding. The method includes: obtaining an area of a current block; if the area of the current block is less than 64, determining that a value of a context model index ctxInc used by a flag skip_flag of the current block is 3; and performing subsequent processing based on the value 3 of the context model index of the flag skip_flag.

According to a fourth aspect, an embodiment of this application provides a processing method applied to video encoding or video decoding. The method includes: obtaining a width of a current block, or a height of the current block, or a width and a height of the current block; if an area that is of the current block and that is determined based on the width and the height of the current block is less than 64, or the width of the current block is greater than 64, or the height of the current block is greater than 64, determining that a value of a context model index ctxInc used by a flag direct_flag of the current block is 1, where the flag direct_flag is used to indicate whether a direct mode is used for the current block; and performing subsequent processing based on the value 1 of the context model index of the flag direct_flag.

According to a fifth aspect, an embodiment of this application provides a processing method applied to video encoding or video decoding. The method includes: obtaining a width of a current block or a height of the current block; if the width of the current block is greater than 64, or the height of the current block is greater than 64, determining that a value of a context model index ctxInc used by a flag pred_mode of the current block is 5, where the flag pred_mode is used to indicate whether an intra prediction mode is used for the current block; and performing subsequent processing based on the value 5 of the context model index of the flag pred_mode.

According to a sixth aspect, an embodiment of this application provides a processing method applied to video encoding or video decoding. The method includes: obtaining a width of a current block or a height of the current block; if the width of the current block is greater than 64, or the height of the current block is greater than 64, determining that a value of a context model index ctxInc used by a flag root_cbf of the current block is 1, where the flag root_cbf is used to indicate whether there is a residual after the current block is coded; and performing subsequent processing based on the value 1 of the context model index of the flag root_cbf.

According to a seventh aspect, an embodiment of this application provides a processing method applied to video encoding or video decoding. The method includes: obtaining a width of a current block; if a picture region in which the current block is located is an I slice or an I frame, and the width of the current block is 128, determining that a value of a context model index ctxInc used by a flag qt_split_flag of the current block is 3, where the flag qt_split_flag is used to indicate whether quadtree split is used for the current block; and performing subsequent processing based on the value 3 of the context model index of the flag qt_split_flag.

According to an eighth aspect, an embodiment of this application provides a processing method applied to video encoding or video decoding. The method includes: obtaining a width of a current block and a height of the current block; and if the width of the current block is 64 and the height of the current block is greater than 64, determining that a value of a context model index ctxInc used by a flag split_dir of the current block is 3, where the flag split_dir is used to indicate a split direction of the current block; and performing subsequent processing based on the value 3 of the context model index of the flag split_dir; or if the height of the current block is 64 and the width of the current block is greater than 64, determining that a value of a context model index ctxInc used by a flag split_dir of the current block is 4, where the flag split_dir is used to indicate a split direction of the current block; and performing subsequent processing based on the value 4 of the context model index of the flag split_dir.

According to a ninth aspect, an embodiment of this application provides a processing apparatus used in video encoding or video decoding. The apparatus includes: an obtaining unit, configured to obtain an area of a current block; a determining unit, configured to: when the area of the current block is less than 64, determine that a value of a context model index ctxInc used by a flag skip_flag of the current block is 3; and a processing unit, configured to perform subsequent processing based on the value 3 of the context model index of the flag skip_flag.

According to a tenth aspect, an embodiment of this application provides a processing apparatus used in video encoding or video decoding. The apparatus includes: an obtaining unit, configured to obtain a width of a current block, or a height of the current block, or a width and a height of the current block; a determining unit, configured to: when an area that is of the current block and that is determined based on the width and the height of the current block is less than 64, or the width of the current block is greater than 64, or the height of the current block is greater than 64, determine that a value of a context model index ctxInc used by a flag direct_flag of the current block is 1, where the flag direct_flag is used to indicate whether a direct mode is used for the current block; and a processing unit, configured to perform subsequent processing based on the value 1 of the context model index of the flag direct_flag.

According to an eleventh aspect, an embodiment of this application provides a processing apparatus used in video encoding or video decoding. The apparatus includes: an obtaining unit, configured to obtain a width of a current block or a height of the current block; a determining unit, configured to: when the width of the current block is greater than 64, or the height of the current block is greater than 64, determine that a value of a context model index ctxInc used by a flag pred_mode of the current block is 5, where the flag pred_mode is used to indicate whether an intra prediction mode is used for the current block; and a processing unit, configured to perform subsequent processing based on the value 5 of the context model index of the flag pred_mode.

According to a twelfth aspect, an embodiment of this application provides a processing apparatus used in video encoding or video decoding. The apparatus includes: an obtaining unit, configured to obtain a width of a current block or a height of the current block; a determining unit, configured to: when the width of the current block is greater than 64, or the height of the current block is greater than 64, determine that a value of a context model index ctxInc used by a flag root_cbf of the current block is 1, where the flag root_cbf is used to indicate whether there is a residual after the current block is coded; and a processing unit, configured to perform subsequent processing based on the value 1 of the context model index of the flag root_cbf.

According to a thirteenth aspect, an embodiment of this application provides a processing apparatus used in video encoding or video decoding. The apparatus includes: an obtaining unit, configured to obtain a width of a current block; a determining unit, configured to: when a picture region in which the current block is located is an I slice or an I frame, and the width of the current block is 128, determine that a value of a context model index ctxInc used by a flag qt_split_flag of the current block is 3, where the flag qt_split_flag is used to indicate whether quadtree split is used for the current block; and a processing unit, configured to perform subsequent processing based on the value 3 of the context model index of the flag qt_split_flag.

According to a fourteenth aspect, an embodiment of this application provides a processing apparatus used in video encoding or video decoding. The apparatus includes: an obtaining unit, configured to obtain a width of a current block and a height of the current block; a determining unit, configured to: when the width of the current block is 64 and the height of the current block is greater than 64, determine that a value of a context model index ctxInc used by a flag split_dir of the current block is 3, where the flag split_dir is used to indicate a split direction of the current block; or when the height of the current block is 64 and the width of the current block is greater than 64, determine that a value of a context model index ctxInc used by a flag split_dir of the current block is 4; and a processing unit, configured to perform subsequent processing based on the value of the context model index of the flag split_dir.

According to a fifteenth aspect, an embodiment of this application provides a video decoder, including an entropy decoding unit. The entropy decoding unit includes the processing apparatus provided in any one of the second aspect, the ninth aspect to the fourteenth aspect, or the implementations of the second aspect.

According to a sixteenth aspect, an embodiment of this application provides a video encoder, including an entropy encoding unit. The entropy encoding unit includes the processing apparatus provided in any one of the second aspect, the ninth aspect to the fourteenth aspect, or the implementations of the second aspect.

According to a seventeenth aspect, an embodiment of this application provides a video coding device, including a nonvolatile memory and a processor that are coupled to each other. The processor calls program code stored in the memory to perform the method provided in any one of the first aspect, the third aspect to the eighth aspect, or the implementations of the first aspect.

According to an eighteenth aspect, an embodiment of this application provides an encoding device, including a nonvolatile memory and a processor that are coupled to each other. The processor calls program code stored in the memory to perform a part of or all operations in the method provided in any one of the first aspect, the third aspect to the eighth aspect, or the implementations of the first aspect.

According to a nineteenth aspect, an embodiment of this application provides a decoding device, including a nonvolatile memory and a processor that are coupled to each other. The processor calls program code stored in the memory to perform a part of or all operations in the method provided in any one of the first aspect, the third aspect to the eighth aspect, or the implementations of the first aspect.

According to a twentieth aspect, an embodiment of this application provides a computer-readable storage medium. The computer-readable storage medium stores program code, and the program code includes instructions used to perform a part of or all operations in the method provided in any one of the first aspect, the third aspect to the eighth aspect, or the implementations of the first aspect.

According to a twenty-first aspect, an embodiment of this application provides a computer program product. When the computer program product runs on a computer, the computer is enabled to perform a par of or all operations in the method provided in any one of the first aspect, the third aspect to the eighth aspect, or the implementations of the first aspect.

It should be understood that, the technical solutions in the second aspect to the twenty-first aspect of this application are consistent with the technical solutions in the first aspect of this application. Beneficial effects achieved in the various aspects and corresponding feasible implementations are similar, and details are not described again.

In comparison with a conventional technology that the value of the context model of the flag of the current block needs to be obtained based on availability of neighboring blocks (for example, a left block and an upper block) of the current block and a value of a corresponding flag, it can be learned from the foregoing that the value of the context model of the flag of the current block can be directly determined based on the size-based constraint in the embodiments of this application, thereby improving coding efficiency. Specifically, the solutions can be used to make a conditional probability of the flag to be maximally close to 0 or 1. Therefore, entropy coding efficiency is improved.

BRIEF DESCRIPTION OF DRAWINGS

To describe the technical solutions in the embodiments of the present disclosure or the background more clearly, the following describes the accompanying drawings in the embodiments of the present disclosure or the background.

DESCRIPTION OF EMBODIMENTS

Figure 1A:
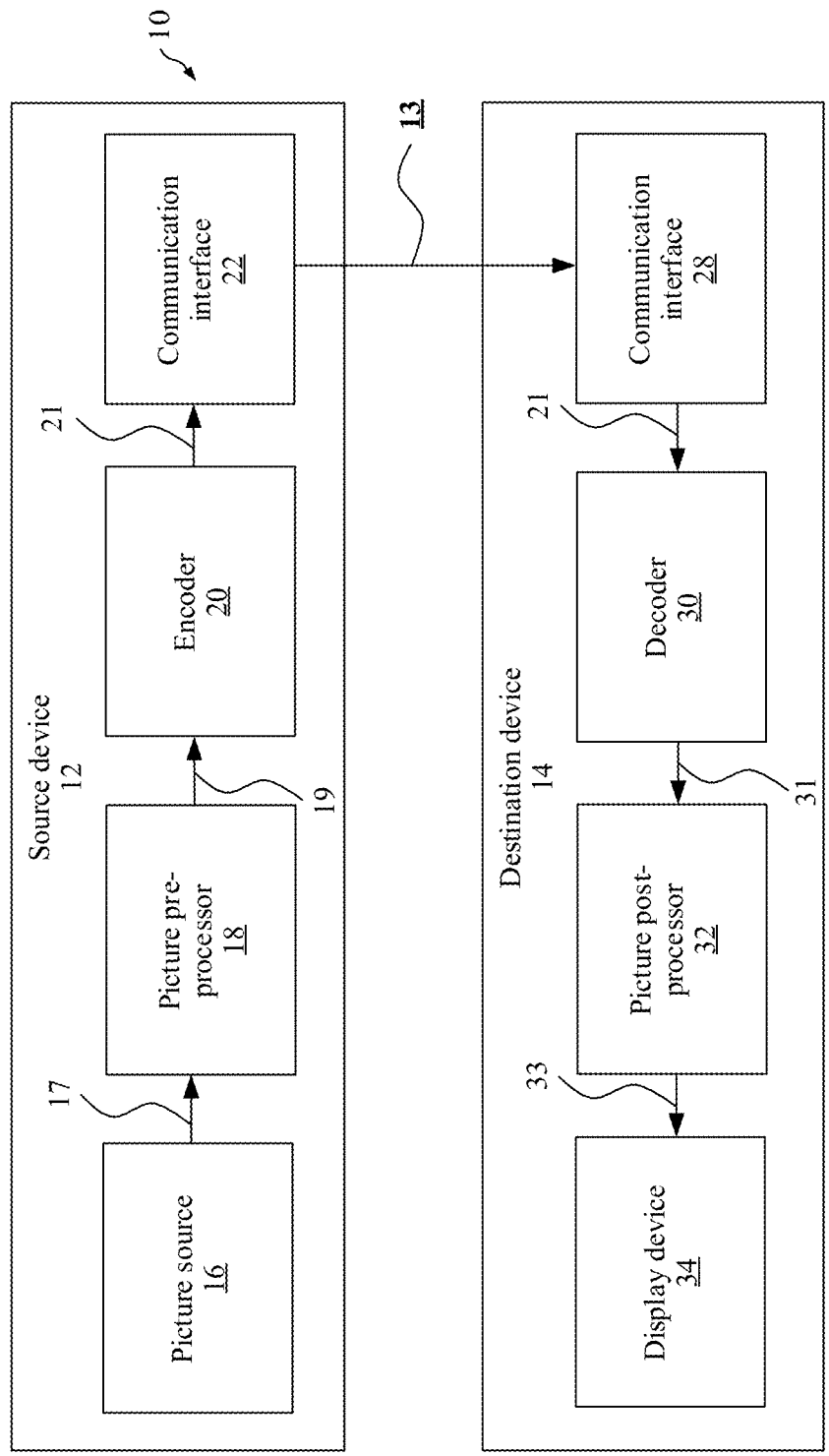
FIG. 1A is a block diagram of an example of a video coding system 10 for implementing an embodiment of the present disclosure.

The following describes the embodiments of the present disclosure with reference to the accompanying drawings in the embodiments of the present disclosure. In the following description, reference is made to the accompanying drawings that form a part of this disclosure and show, by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed description shall not be understood in a limiting sense, and the scope of the present disclosure is defined by the appended claims. For example, it should be understood that disclosed content with reference to described methods may also hold true for a corresponding device or system configured to perform the method, and vice versa. For example, if one or more specific method operations are described, a corresponding device may include one or more units such as functional units for performing the described one or more method operations (for example, one unit performs the one or more operations; or a plurality of units, each of which performs one or more of the plurality of operations), even if such one or more units are not explicitly described or illustrated in the accompanying drawings. In addition, for example, if a specific apparatus is described based on one or more units such as a functional unit, a corresponding method may include a operation used to perform one or more functionalities of one or more units (for example, one operation used to perform one or more functionalities of one or more units; or a plurality of operations, each of which is used perform one or more functionalities of one or more units in a plurality of units), even if such one or more of operations are not explicitly described or illustrated in the accompanying drawings. Further, it should be understood that features of the various example embodiments and/or aspects described in this specification may be combined with each other, unless otherwise specified.

The technical solutions in the embodiments of the present disclosure may not only be applied to existing video coding standards (for example, standards such as H.264 and HEVC), but also be applied to future video coding standards (for example, the H.266 standard). Terms used in implementations of the present disclosure are merely intended to explain specific embodiments of the present disclosure, but are not intended to limit the present disclosure. The following first briefly describes some concepts that may be used in the embodiments of the present disclosure.

Video coding typically refers to processing of a sequence of pictures that constitute a video or a video sequence. In the field of video coding, the terms "picture", "frame", and "image" may be used as synonyms. Video coding used in this specification refers to video encoding or video decoding. Video encoding is performed on a source side, and usually includes processing (for example, by compressing) an original video picture to reduce an amount of data for representing the video picture, for more efficient storage and/or transmission. Video decoding is performed on a destination side, and typically includes inverse processing in comparison with an encoder to reconstruct a video picture. "Coding" of a video picture in the embodiments should be understood as "encoding" or "decoding" of a video sequence. A combination of encoding components and decoding components is also referred to as codec (CODEC).

A video sequence includes a series of pictures (picture), a picture is further split into slices (slice), and a slice is further split into blocks (block). Video coding is performed by blocks. In some new video coding standards, the concept "block" is further extended. For example, a macroblock (MB) is introduced to the H.264 standard. The macroblock may further be split into a plurality of prediction blocks (partition) that can be used for predictive coding. In the high efficiency video coding (HEVC) standard, basic concepts such as "coding unit" (CU), "prediction unit" (PU), and "transform unit" (TU) are used. A plurality of block units are obtained through functional division, and are described by using a new tree-based structure. For example, a CU may be split into smaller CUs through quadtree split, and the smaller CU may further be split, to generate a quadtree structure. The CU is a basic unit for splitting and encoding a coding picture. A PU and a TU also have similar tree structures. The PU may correspond to a prediction block, and is a basic unit for predictive coding. The CU is further partitioned into a plurality of PUs in a partitioning pattern. The TU may correspond to a transform block, and is a basic unit for transforming a prediction residual. However, all of the CU, the PU, and the TU are concepts of blocks (or picture blocks) in essence.

For example, in HEVC, a CTU is partitioned into a plurality of CUs by using a quadtree structure represented as a coding tree. A decision on whether to encode a picture area by using inter-picture (temporal) or intra-picture (spatial) prediction is made at a CU level. Each CU may further be split into one, two, or four PUs based on a PU splitting pattern. In one PU, a same prediction process is applied, and related information is transmitted to a decoder on a PU basis. After obtaining a residual block by applying the prediction process based on the PU splitting pattern, the CU may be partitioned into transform units (TU) based on another quadtree structure similar to the coding tree used for the CU. In latest development of video compression technologies, a quadtree plus binary tree (QTBT) partition frame is used to split a coding block. In a QTBT block structure, the CU may be square or rectangular.

In this specification, for ease of description and understanding, a to-be-encoded picture block in a current coded picture may be referred to as a current block. For example, in encoding, the current block is a block that is currently being encoded; and in decoding, the current block is a block that is currently being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be used as a prediction block, where the prediction signal represents a pixel value, a sample value, or a sample signal in the prediction block. For example, an optimal reference block is found after a plurality of reference blocks are traversed, the optimal reference block provides prediction for the current block, and this block is referred to as a prediction block.

In a case of lossless video coding, original video pictures can be reconstructed, and this means that reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. This means that quality of reconstructed video pictures is lower or poorer than that of the original video pictures.

Several H.261 video coding standards are used for "lossy hybrid video codecs" (namely, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is typically processed, that is, encoded, at a block (video block) level. For example, a prediction block is generated through spatial (intra-picture) prediction and/or temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On the decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

The following describes a system architecture to which the embodiments of the present disclosure are applied. FIG. 1A is a schematic block diagram of an example of a video coding system 10 to which an embodiment of the present disclosure is applied. As shown in FIG. 1A, the video coding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of instructions or data structures accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smartphone", a television, a camera, a display apparatus, a digital media player, a video game console, an in-vehicle computer, a wireless communication device, and the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communication media that enable the source device 12 to directly transmit the encoded video data to the destination device 14 in real time. In this example, the source device 12 may modulate the encoded video data according to a communication standard (for example, a wireless communication protocol), and may transmit modulated video data to the destination device 14. The one or more communication media may include a wireless communication medium and/or a wired communication medium, for example, a radio frequency (RF) spectrum or one or more physical transmission cables. The one or more communication media may be a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20, and optionally, the source device 12 may further include a picture source 16, a picture pre-processor 18, and a communication interface 22. In a specific implementation form, the encoder 20, the picture source 16, the picture preprocessor 18, and the communication interface 22 may be hardware components in the source device 12, or may be software programs in the source device 12. Separate descriptions are as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera for capturing a picture or a memory for storing a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be, for example, a local memory or a memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements. The picture element in the array may also be referred to as a sample. A quantity of samples in horizontal and vertical directions (or axes) of the array or the picture defines a size and/or a resolution of the picture. For representation of a color, typically three color components are employed. For example, the picture may be represented as or include three sample arrays. For example, in an RGB format or a color space, a picture includes corresponding red, green, and blue sample arrays. However, in video coding, each pixel is typically represented in a luminance/chrominance format or a color space. For example, a picture in a YUV format includes a luminance component indicated by Y (sometimes L is used instead) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be converted or transformed into a picture in the YUV format and vice versa, and such a process is also known as color transformation or conversion. If a picture is monochrome, the picture may include only a luma sample array. In this embodiment of the present disclosure, a picture transmitted by the picture source 16 to a picture processor may also be referred to as original picture data 17.

The picture pre-processor 18 is configured to receive the original picture data 17 and pre-process the original picture data 17, to obtain a pre-processed picture 19 or pre-processed picture data 19. For example, the pre-processing performed by the picture pre-processor 18 may include trimming, color format conversion (for example, from an RGB format to a YUV format), color correction, or denoising.

The encoder 20 (also referred to as a video encoder 20) is configured to receive the pre-processed picture data 19, and process the pre-processed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of the chroma block prediction method described in the present disclosure.

The communication interface 22 may be configured to receive the encoded picture data 21, and transmit the encoded picture data 21 to the destination device 14 or any other device (for example, a memory) over the link 13 for storage or direct reconstruction. The any other device may be any device used for decoding or storage. The communication interface 22 may be, for example, configured to package the encoded picture data 21 into an appropriate format, for example, a data packet, for transmission over the link 13.

The destination device 14 includes a decoder 30, and optionally, the destination device 14 may further include a communication interface 28, a picture post-processor 32, and a display device 34. Separate descriptions are as follows.

The communication interface 28 may be configured to receive the encoded picture data 21 from the source device 12 or any other source. The any other source is, for example, a storage device. The storage device is, for example, an encoded picture data storage device. The communication interface 28 may be configured to transmit or receive the encoded picture data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to depackage the data packet transmitted through the communication interface 22, to obtain the encoded picture data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

The decoder 30 (also referred to as the decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of the chroma block prediction method described in the present disclosure.

The picture post-processor 32 is configured to post-process the decoded picture data 31 (also referred to as reconstructed picture data), to obtain post-processed picture data 33. The post-processing performed by the picture post-processor 32 may include color format conversion (for example, from a YUV format to an RGB format), color correction, trimming, re-sampling, or any other processing. The picture post-processor 32 may further be configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

As will be apparent for a person skilled in the art based on the descriptions, existence and (exact) split of functionalities of the different units or functionalities of the source device 12 and/or the destination device 14 shown in FIG. 1A may vary depending on an actual device and application. The source device 12 and the destination device 14 each may be any one of a wide range of devices, including any type of handheld or stationary device, for example, a notebook or laptop computer, a mobile phone, a smartphone, a pad or a tablet computer, a video camera, a desktop computer, a set-top box, a television, a camera, a vehicle-mounted device, a display device, a digital media player, a video game console, a video streaming device (such as a content service server or a content distribution server), a broadcast receiver device, or a broadcast transmitter device, and may not use or may use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in an appropriate non-transitory computer-readable storage medium and may execute the instructions by using hardware such as one or more processors, to perform the technologies of this disclosure. Any one of the foregoing content (including hardware, software, a combination of hardware and software, and the like) may be considered as one or more processors.

In some cases, the video coding system 10 shown in FIG. 1A is merely an example and the techniques of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode and store data in the memory, and/or a video decoding device may retrieve and decode data from the memory. In some examples, the encoding and the decoding are performed by devices that do not communicate with one another, but simply encode data to the memory and/or retrieve and decode data from the memory.

Figure 1B:
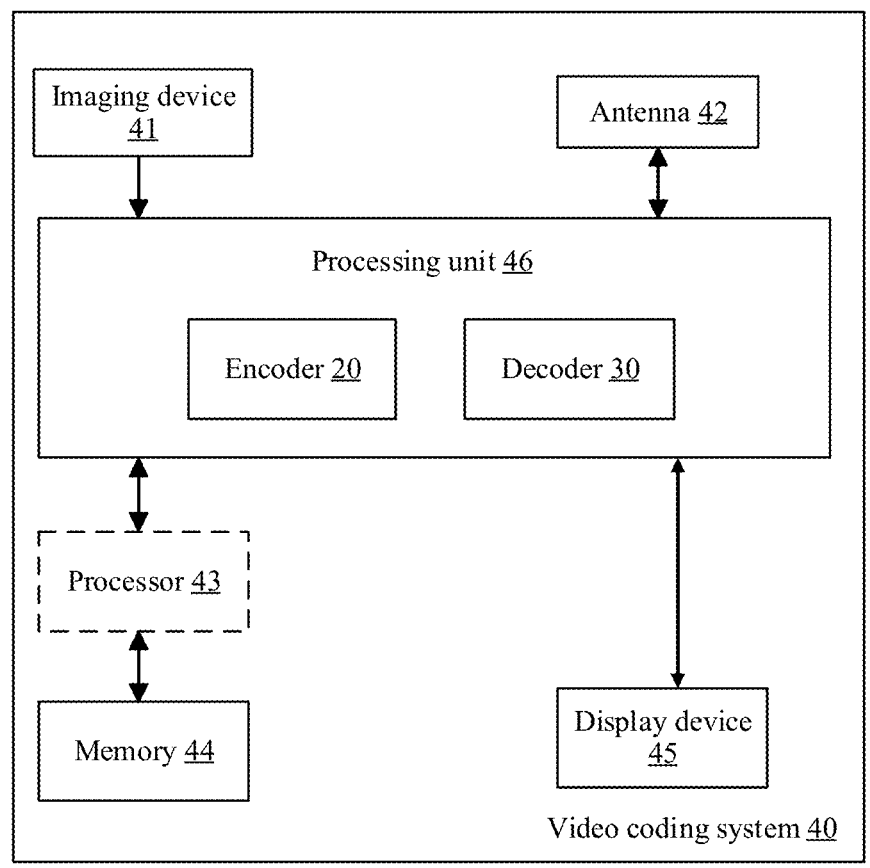
FIG. 1B is a block diagram of an example of a video coding system 40 for implementing an embodiment of the present disclosure.
Figure 2:
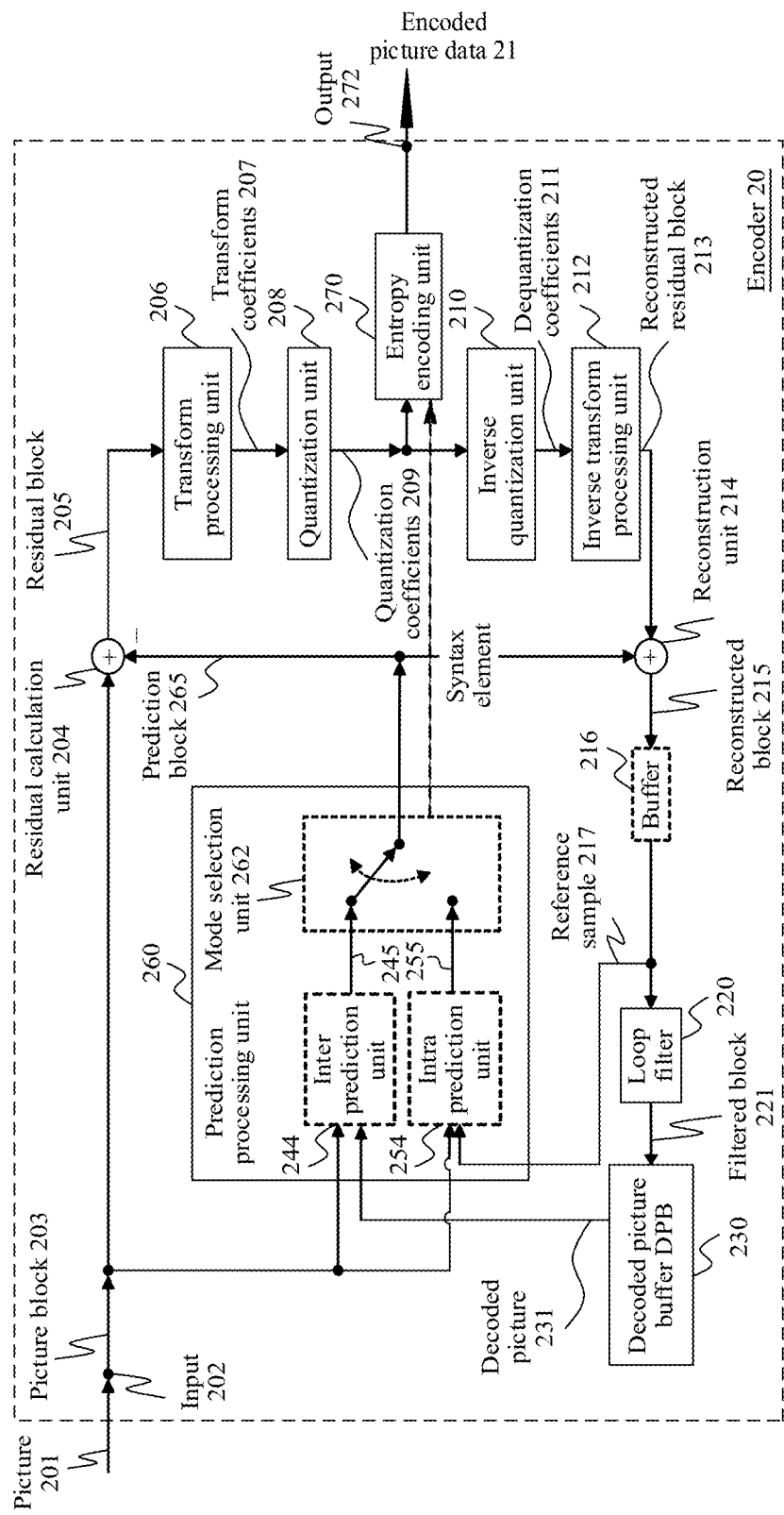
FIG. 2 is a block diagram of an example structure of an encoder 20 for implementing an embodiment of the present disclosure.
Figure 3:
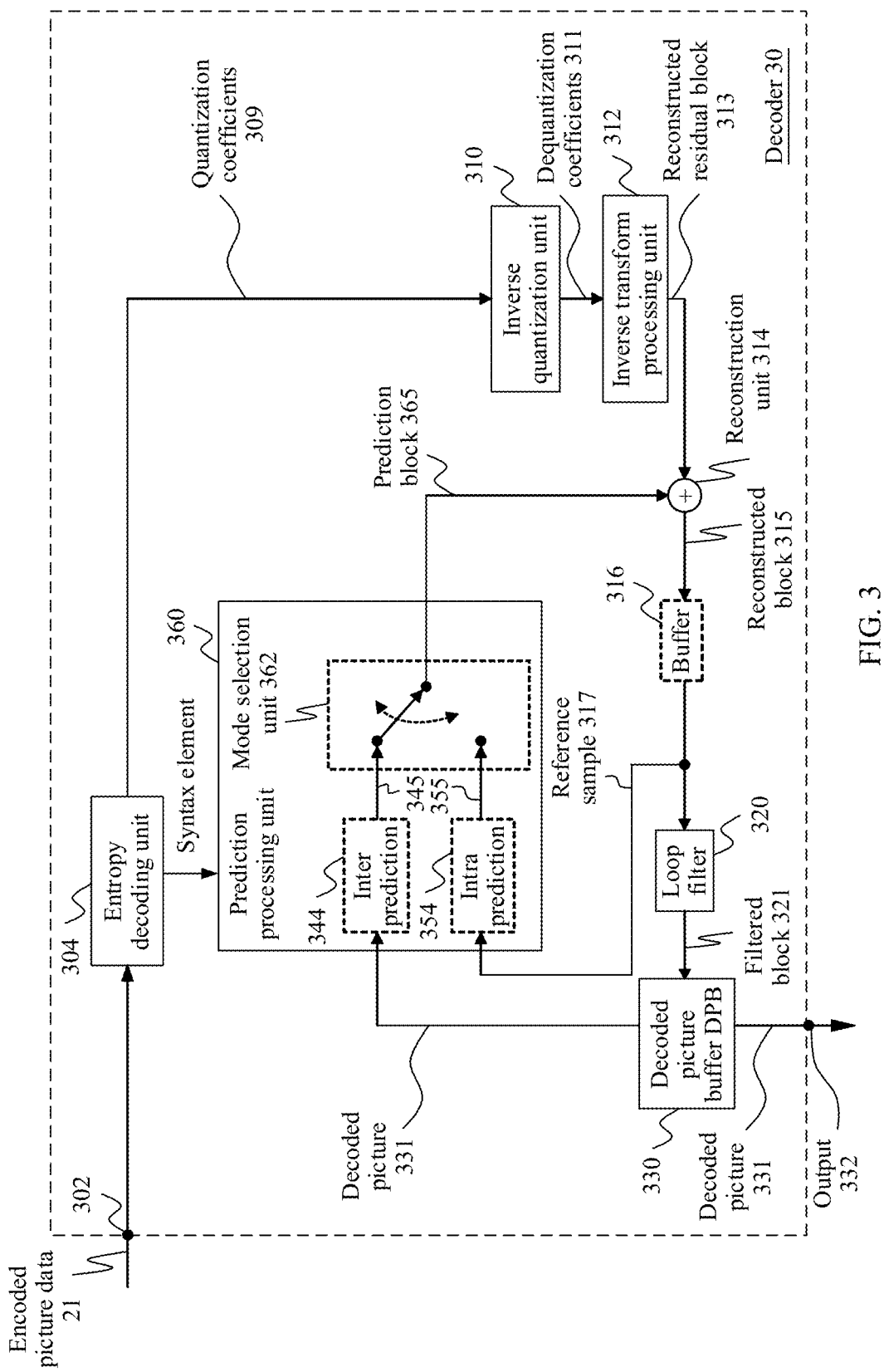
FIG. 3 is a block diagram of an example structure of a decoder 30 for implementing an embodiment of the present disclosure.

FIG. 1B is an illustrative diagram of an example of a video coding system 40, including the encoder 20 in FIG. 2 and/or the decoder 30 in FIG. 3, according to an example embodiment. The video coding system 40 can implement a combination of various techniques in the embodiments of the present disclosure. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

In FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include an application-specific integrated circuit (ASIC) logic, a graphics processor, a general-purpose processor, or the like. The video coding system 40 may also include the optional processor 43. The optional processor 43 may similarly include an application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-restrictive example, the memory 44 may be implemented by a cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by a processing unit 46 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of the present disclosure, for the example described with reference to the encoder 20, the decoder 30 may be configured to perform an inverse process. With regard to a signaling syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that the method described in the embodiments of the present disclosure is mainly used in an inter prediction process, and the process exists in both the encoder 20 and the decoder 30. The encoder 20/the decoder 30 in the embodiments of the present disclosure may be an encoder/decoder corresponding to a video standard protocol such as H.263, H.264, HEVV, MPEG-2, MPEG-4, VP8, or VP9, or corresponding to a next-generation video standard protocol (such as H.266).

FIG. 2 is a schematic/conceptual block diagram of an example encoder 20 configured to implement an embodiment of the present disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not depicted in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a reverse signal path of the encoder. The reverse signal path of the encoder corresponds to a signal path of a decoder (refer to the decoder 30 in FIG. 3).

The encoder 20 receives, for example, from an input 202, a picture 201 or a picture block 203 of the picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

In an embodiment, the encoder 20 may include a partitioning unit (not depicted in FIG. 2), configured to partition the picture 201 into a plurality of blocks such as the picture blocks 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning techniques described above.

Like the picture 201, the picture block 203 is also or may be considered as a two-dimensional array or matrix of samples with sample values, although of a smaller size than the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 by blocks, for example, the encoder encodes and predicts each picture block 203.

The residual calculation unit 204 is configured to calculate a residual block 205 based on the picture block 203 and a prediction block 265 (further details about the prediction block 265 are provided below), for example, obtain the residual block 205 in a sample domain by subtracting sample values of the prediction block 265 from sample values of the picture block 203 sample by sample (pixel by pixel).

The transform processing unit 206 is configured to apply a transform, for example, a discrete cosine transform (DCT) or a discrete sine transform (DST), on sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply an integer approximation of DCT/DST, such as transforms specified in HEVC/H.265. In comparison with an orthogonal DCT transform, such an integer approximation is typically scaled by a factor. To preserve a norm of a residual block that is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. Specific scale factors are specified for the inverse transform, for example, by the inverse transform processing unit 212 on the decoder side 30 (and the corresponding inverse transform, for example, by the inverse transform processing unit 212 on the encoder side 20), and correspondingly, a corresponding scale factor may be specified for the forward transform, for example, by the transform processing unit 206 on the encoder side 20.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. The quantization process may reduce a bit depth associated with some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (QP). The quantization parameter may be, for example, an index of a predefined set of applicable quantization steps. For example, a smaller quantization parameter may correspond to finer quantization (a smaller quantization step) and a larger quantization parameter may correspond to coarser quantization (a larger quantization step) or vice versa. The quantization may include division by a quantization step and corresponding quantization and/or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter using a fixed point approximation of an equation including division. An additional scale factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where loss increases with an increasing quantization step.

The inverse quantization unit 210 is configured to apply inverse quantization of the quantization unit 208 to quantization coefficients to obtain dequantization coefficients 211, for example, apply, based on or by using a same quantization step as the quantization unit 208, the inverse of a quantization scheme applied by the quantization unit 208. The dequantization coefficients 211 may also be referred to as dequantized residual coefficients 211 and correspond, although typically not identical to the transform coefficients due to the loss by quantization, to the transform coefficients 207.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (namely, a reconstructed residual block 213) to the prediction block 265 to obtain a reconstructed block 215 in a sample domain, for example, by adding a sample value of the reconstructed residual block 213 and the sample value of the prediction block 265.

In an embodiment, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value stored in the buffer unit 216 for any type of estimation and/or prediction, for example, intra prediction.

For example, in an embodiment, the encoder 20 may be configured, so that the buffer unit 216 is not only used for storing the reconstructed block 215 for the intra prediction unit 254 but also used for the loop filter unit 220 (not depicted in FIG. 2), and/or so that, for example, the buffer unit 216 and the decoded picture buffer unit 230 form one buffer. In other embodiments, a filtered block 221 and/or a block or a sample from the decoded picture buffer 230 (the block or sample is not depicted in FIG. 2) are/is used as an input or a basis for the intra prediction unit 254.

The loop filter unit 220 (briefly referred to as a "loop filter" 220) is configured to filter the reconstructed block 215 to obtain the filtered block 221, to smooth pixel transition or improve video quality. The loop filter unit 220 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 220 is shown in FIG. 2 as an in-loop filter, in other configurations, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

The decoded picture buffer (DPB) 230 may be a reference picture memory that stores reference picture data for use in encoding video data by the encoder 20. The DPB 230 may be formed by any one of a variety of memory devices, such as a dynamic random access memory (DRAM) (including a synchronous DRAM (SDRAM), a magnetoresistive RAM (MRAM), and a resistive RAM (RRAM)), or another type of memory devices. The DPB 230 and the buffer 216 may be provided by a same memory device or separate memory devices. In an example, the decoded picture buffer (DPB) 230 is configured to store the filtered block 221. The decoded picture buffer 230 may further be configured to store another previously filtered block, for example, the previously reconstructed and filtered block 221, of a same current picture or of different pictures, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of a same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra prediction mode or an inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260). The prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides minimum rate-distortion optimization or select a prediction mode for which related rate distortion at least satisfies a prediction mode selection criterion.

In the following, prediction processing (for example, performed by the prediction processing unit 260) and mode selection (for example, performed by the mode selection unit 262) performed by the example encoder 20 are to be explained in detail.

As described above, the encoder 20 is configured to determine or select the optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least some decoded pictures stored in the DPB 230, as described above) and other inter prediction parameters, for example, depends on whether an entire reference picture or only a part of the reference picture, for example, a search window region around a region of a current block, is used for searching for an optimal matched reference block, and/or for example, depends on whether pixel interpolation such as half-pixel and/or quarter-pixel interpolation is applied. The set of inter prediction modes may include, for example, an advanced motion vector prediction (AMVP) mode and a merge (merge) mode. In specific implementation, the set of inter prediction modes may include a refined control point-based AMVP mode and a refined control point-based merge mode in the embodiments of the present disclosure. In an example, the intra prediction unit 254 may be configured to perform any combination of inter prediction techniques described below.

In addition to the foregoing prediction modes, a skip mode and/or a direct mode may also be applied in the embodiments of the present disclosure.

The prediction processing unit 260 may further be configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode applied to each of the block partitions or subblocks.

The inter prediction unit 244 may include a motion estimation (ME) unit (not depicted in FIG. 2) and a motion compensation (MC) unit (not depicted in FIG. 2). The motion estimation unit is configured to receive or obtain the picture block 203 (the current picture block 203 of the current picture 201) and the decoded pictures 231, or at least one or more previously reconstructed blocks, for example, one or more reconstructed blocks of one or more other/different previously decoded pictures 231, for motion estimation. For example, a video sequence may include the current picture and a previously decoded picture 31. In other words, the current picture and the previously decoded picture 31 may be a part of a sequence of pictures forming a video sequence or form the sequence of pictures.

For example, the encoder 20 may be configured to select a reference block from a plurality of reference blocks of a same picture or different pictures in a plurality of other pictures and provide, for a motion estimation unit (not depicted in FIG. 2), a reference picture and/or provide an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not depicted in FIG. 2) may include extracting or generating a prediction block based on a motion/block vector determined through motion estimation (interpolation may be performed at a sub-sample precision level). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one of reference picture lists. The motion compensation unit 246 may further generate a syntax element associated with a block and a video slice, for use by the decoder 30 in decoding a picture block of the video slice.

Specifically, the inter prediction unit 244 may transmit a syntax element to the entropy encoding unit 270, where the syntax element includes an inter prediction parameter (for example, indication information of an inter prediction mode that is selected for prediction of the current block after a plurality of inter prediction modes are traversed). In a possible application scenario, if there is only one inter prediction mode, the inter prediction parameter may alternatively not be carried in the syntax element. In this case, the decoder side 30 may directly perform decoding in a default prediction mode. It can be understood that the inter prediction unit 244 may be configured to perform any combination of inter prediction techniques.

The intra prediction unit 254 is configured to obtain, for example, receive, a picture block 203 (the current picture block) and one or more previously reconstructed blocks, for example, reconstructed neighboring blocks, of a same picture for intra estimation. The encoder 20 may be, for example, configured to select an intra prediction mode from a plurality of (predetermined) intra prediction modes.

In an embodiment, the encoder 20 may be configured to select an intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter of the selected intra prediction mode. In any case, after selecting the intra prediction mode for a block, the intra prediction unit 254 is further configured to provide the intra prediction parameter, that is, information indicating the selected intra prediction mode for the block, for the entropy encoding unit 270. In an example, the intra prediction unit 254 may be configured to perform any combination of intra prediction techniques.

Specifically, the intra prediction unit 254 may transmit a syntax element to the entropy encoding unit 270, where the syntax element includes an intra prediction parameter (for example, indication information of an intra prediction mode that is selected for prediction of the current block after a plurality of intra prediction modes are traversed). In a possible application scenario, if there is only one intra prediction mode, the intra prediction parameter may alternatively not be carried in the syntax element. In this case, the decoder side 30 may directly perform decoding in a default prediction mode.

The entropy encoding unit 270 is configured to apply (or bypass) an entropy encoding algorithm or a scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantization coefficients 209, the inter prediction parameter, the intra prediction parameter, and/or the loop filter parameter, to obtain the encoded picture data 21 that can be output through an output 272, for example, in a form of an encoded bitstream 21. The encoded bitstream may be transmitted to the video decoder 30, or archived for later transmission or retrieval by the video decoder 30. The entropy encoding unit 270 may further be configured to entropy encode another syntax element for a current video slice being encoded.

Other structural variations of the video encoder 20 may be configured to encode a video stream. For example, a non-transform based encoder 20 may quantize a residual signal directly without the transform processing unit 206 for some blocks or frames. In another implementation, the encoder 20 includes the quantization unit 208 and the inverse quantization unit 210 that can be combined into a single unit.

Specifically, in this embodiment of the present disclosure, the encoder 20 can be configured to implement a method described in the following embodiments.

It should be understood that other structural variations of the video encoder 20 may be configured to encode a video stream. For example, for some picture blocks or picture frames, the video encoder 20 may quantize the residual signal directly without processing by the transform processing unit 206, and correspondingly, without processing by the inverse transform processing unit 212. Alternatively, for some picture blocks or picture frames, the video encoder 20 does not generate residual data, and correspondingly, there is no need for the transform processing unit 206, the quantization unit 208, the inverse quantization unit 210, and the inverse transform processing unit 212 to perform processing. Alternatively, the video encoder 20 may directly store a reconstructed picture block as a reference block, without processing by the filter 220. Alternatively, the quantization unit 208 and the inverse quantization unit 210 in the video encoder 20 may be combined together. The loop filter 220 is optional. In a case of lossless compression encoding, the transform processing unit 206, the quantization unit 208, the inverse quantization unit 210, and the inverse transform processing unit 212 are optional. It should be understood that in different application scenarios, the inter prediction unit 244 and the intra prediction unit 254 may be used selectively.

FIG. 3 is a schematic/conceptual block diagram of an example decoder 30 configured to implement an embodiment of the present disclosure. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and associated syntax elements.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, quantization coefficients 309 and/or decoded encoding parameters (not depicted in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in functions, and the intra prediction unit 354 may resemble the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is coded as an intra coded (I) slice, the intra prediction unit 354 of the prediction processing unit 360 is configured to generate a prediction block 365 for a picture block of the current video slice based on a signaled intra prediction mode and data that is from a previously decoded block of a current frame or picture. When a video frame is coded as an inter-coded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists: a list 0 and a list 1, by using a default construction technique based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. In an example of the present disclosure, the prediction processing unit 360 determines, by using some received syntax elements, a prediction mode (for example, intra prediction or inter prediction) for encoding the video block in the video slice, an inter prediction slice type (for example, a B slice, a P slice, or a GPB slice), construction information of one or more of the reference picture lists for the slice, a motion vector of each inter encoded video block for the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to inverse quantize (namely, dequantize) a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to the transform coefficient to generate a residual block in a pixel domain.

The reconstruction unit 314 (for example, the summer 314) is configured to add an inverse transform block 313 (namely, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering techniques described below. The loop filter unit 320 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 320 is shown in FIG. 3 as an in-loop filter, in other configurations, the loop filter unit 320 may be implemented as a post-loop filter.

A decoded video block in a given frame or picture is then stored in the decoded picture buffer 330 that stores a reference picture used for subsequent motion compensation.

The decoder 30 is configured to, for example, output the decoded picture 31 through an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another implementation, the video decoder 30 includes the inverse quantization unit 310 and the inverse transform processing unit 312 that can be combined into a single unit.

Specifically, in this embodiment of the present disclosure, the decoder 30 is configured to implement a method described in the following embodiments.

It should be understood that other structural variations of the video decoder 30 may be configured to decode the encoded video bitstream. For example, the video decoder 30 may generate an output video stream without processing performed by the filter 320. Alternatively, for some picture blocks or picture frames, the entropy decoding unit 304 of the video decoder 30 does not obtain quantization coefficients through decoding, and correspondingly, there is no need for the inverse quantization unit 310 and the inverse transform processing unit 312 to perform processing. The loop filter 320 is optional. In a case of lossless compression, the inverse quantization unit 310 and the inverse transform processing unit 312 are optional. It should be understood that in different application scenarios, the inter prediction unit and the intra prediction unit may be used selectively.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current picture block or a motion vector of a subblock of the current picture block derived from a motion vector of a neighboring affine coded block may further be processed. This is not limited in this application. For example, a value of a motion vector is restricted to be within a specific bit width range. Assuming that an allowed bit width of a motion vector is bitDepth, a value of the motion vector ranges from $-2\wedge(\text{bitDepth}-1)$ to $2\wedge(\text{bitDepth}-1)-1$, where the symbol "$\wedge$" represents exponentiation. If bitDepth is 16, the value range is from −32768 to 32767. If bitDepth is 18, the value ranges from −131072 to 131071. For another example, values of motion vectors (for example, motion vectors MVs of four 4×4 subblocks in an 8×8 picture block) are restricted, so that a maximum difference between integer parts of the MVs of the four 4×4 subblocks does not exceed N pixels, for example, does not exceed one pixel.

The following two manners may be used to restrict the motion vector to be within a specific bit width:

Manner 1: An overflow most significant bit of the motion vector is removed:

$$ux=(vx+2^{bitDepth})\%2^{bitDepth}$$

$$vx=(ux>=2^{bitDepth-1})?(ux-2^{bitDepth}):ux$$

$$uy=(vy+2^{bitDepth})\%2^{bitDepth}$$

$$vy=(uy>=2^{bitDepth-1})?(uy-2^{bitDepth}):uy$$

vx represents a horizontal component of the motion vector of the picture block or the subblock of the picture block, vy represents a vertical component of the motion vector of the picture block or the subblock of the picture block, and ux and uy are intermediate values, and bitDepth represents a bit depth.

For example, a value of vx is −32769, and 32767 is derived according to the foregoing formulas. A value is stored in a computer in a two's complement representation, a two's complement representation of −32769 is 1,0111, 1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clipping is performed on the motion vector, as shown in the following formulas:

$$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

vx represents a horizontal component of the motion vector of the picture block or the subblock of the picture block. vy represents a vertical component of the motion vector of the picture block or the subblock of the picture block. x, y, and z correspond to three input values of an MV clamping process clip3. Clip3 is defined to indicate clipping a value of z to a range [x, y].

$$\text{Clip3}(x, y, z) = \begin{cases} x; & z < x \\ y; & z > y \\ z; & \text{otherwise} \end{cases}$$

Figure 4:
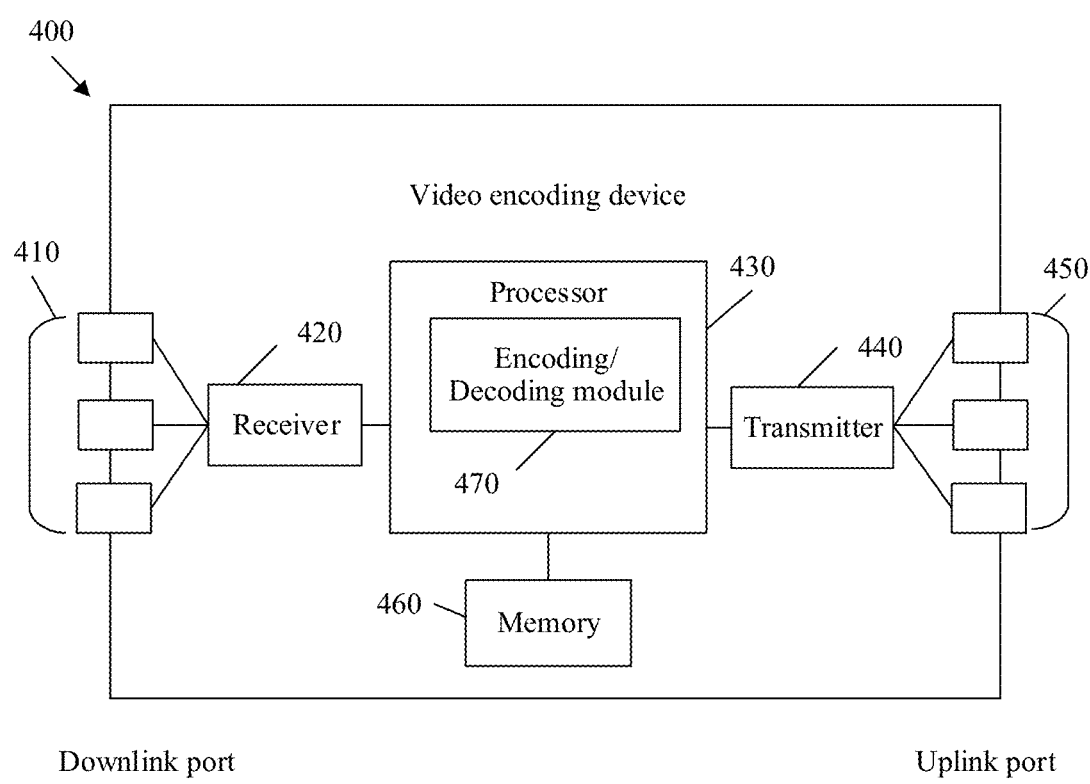
FIG. 4 is a block diagram of an example of a video coding device 400 for implementing an embodiment of the present disclosure.

FIG. 4 is a schematic structural diagram of a video coding device 400 (for example, a video encoding device 400 or a video decoding device 400) according to an embodiment of the present disclosure. The video coding device 400 is suitable for implementing an embodiment described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver unit (Rx) 420 that are configured to receive data; a processor, a logic unit, or a central processing unit (CPU) 430 that is configured to process data; a transmitter unit (Tx) 440 and egress ports 450 that are configured to transmit data; and a memory 460 configured to store data. The video coding device 400 may further include an optical-to-electrical component and an electrical-to-optical (EO) component that are coupled to the ingress ports 410, the receiver unit 420, the transmitter unit 440, and the egress ports 450, for egress or ingress of optical or electrical signals.

The processor 430 is implemented by using hardware and software. The processor 430 may be implemented as one or more CPU chips, cores (for example, multi-core processors), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the chroma block prediction method provided in the embodiments of the present disclosure. For example, the encoding/decoding module 470 implements, processes, or provides various coding operations. Therefore, the encoding/decoding module 470 provides a substantial improvement to functions of the video coding device 400 and affects a transform of the video coding device 400 to a different state. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
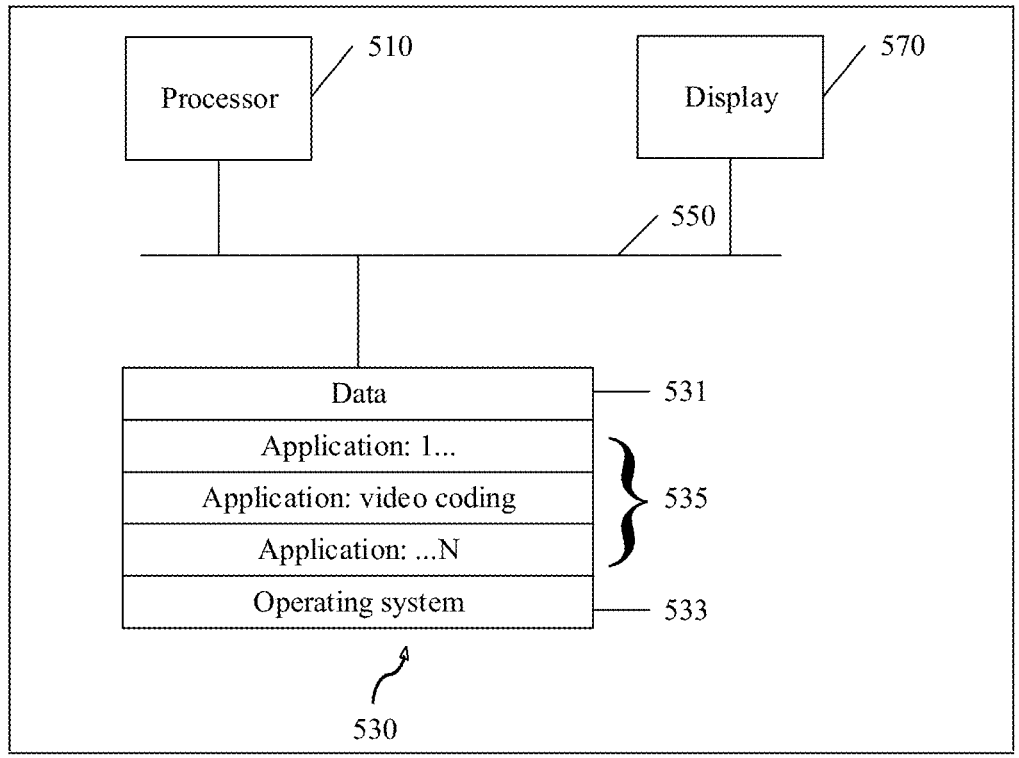
FIG. 5 is a block diagram of another example of an encoding apparatus or a decoding apparatus for implementing an embodiment of the present disclosure.

FIG. 5 is simplified block diagram of an apparatus 500 that can be used as either or both of the source device 12 and the destination device 14 in FIG. 1A according to an example embodiment. The apparatus 500 can implement the technologies of this application. In other words, FIG. 5 is a schematic block diagram of an implementation of an encoding device or a decoding device (coding device 500 for short) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code. The processor can call the program code stored in the memory, to perform various video encoding or decoding methods described in this application, and in particular, various new methods. To avoid repetition, details are not described herein again.

In this embodiment of this application, the processor 510 may be a central processing unit ("CPU" for short), or the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 530 may include a read-only memory (ROM) device or a random access memory (RAM) device. Any other suitable type of storage device may alternatively be used as the memory 530. The memory 530 may include code and data 531 accessed by the processor 510 by using the bus system 550. The memory 530 may further include an operating system 533 and an application program 535. The application program 535 includes at least one program that allows the processor 510 to perform the video encoding or decoding method (in particular, the method described in this application) described in this application. For example, the application program 535 may include applications 1 to N, and further includes a video encoding or decoding application (video coding application for short) that performs the video encoding or decoding method described in this application.

The bus system 550 may not only include a data bus, but also include a power bus, a control bus, a status signal bus, and the like. However, for clear description, various types of buses in the figure are marked as the bus system 550.

In an embodiment, the coding device 500 may further include one or more output devices, for example, a display 570. In an example, the display 570 may be a touch sensitive display that combines a display and a touch sensitive unit that is operable to sense a touch input. The display 570 may be connected to the processor 510 through the bus system 550.

The following describes in detail the solutions in the embodiments of this application.

For example, in AVS3, to facilitate hardware processing and improve encoding performance, a constraint is set on a transform module, an inter prediction module, and the like, so that only a specified split mode or only a specified prediction mode can be used on an encoder side under a stipulated constraint. For example, constraints that are set on the encoder side are as follows:

(a) Constraint on small blocks for bidirectional inter prediction: When an area of a current block is less than 64, bidirectional prediction is not used.

(b) Constraint on large blocks for transform: A maximum prediction unit (TU) is set as maxTU, and maxTU is a fixed value, for example, 128, 64, or 32, where a default value of maxTU is 64.

If a picture region in which the current block is located is an I slice or an I frame, and both the current width and the current height are S, a split mode QT is forcibly used for the current node, where S is a positive integer, for example, 128 or 256. In this case, it is determined that a value of qt_split_flag is 1.

(c) Constraint on a hardware virtual logic processing unit: If a size of a block corresponding to a current to-be-split node is 128×64, only a vertical binary tree VBT split can be used. In this case, it is determined that a value of split_dir is 1. If a size of a block corresponding to a current to-be-split node is 64×128, only a horizontal binary tree HBT split can be used. In this case, it is determined that a value of split_dir is 0.

Figure 6:
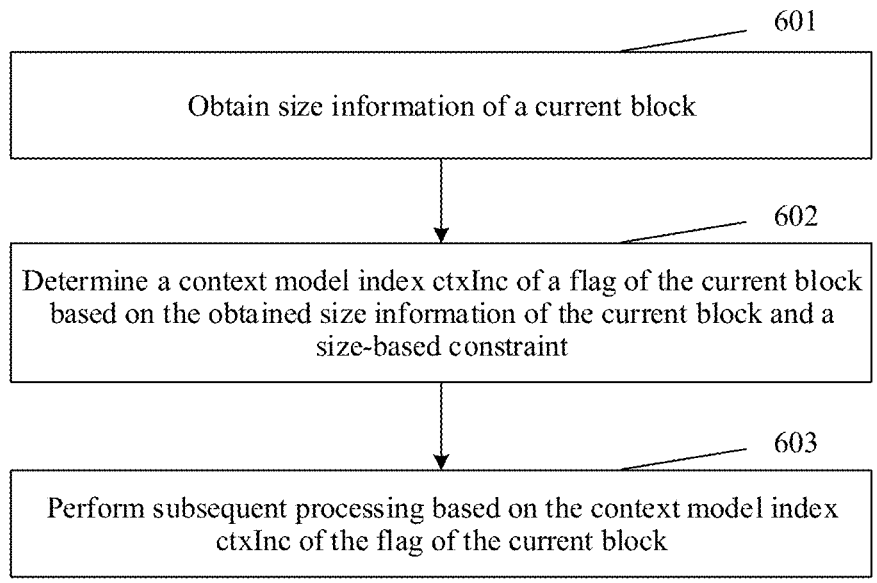
FIG. 6 is a schematic flowchart of a processing method for implementing an embodiment of the present disclosure.

In an embodiment of the present disclosure, a context model of a flag of the current block may be determined based on a size-based constraint, and the determining method may be applied to video coding standards such as AVS3 or HEVC. The size may be the width of the current block, and/or the height of the current block, and/or an area of the current block. The current block may be a luma block or a chroma block. A method provided in an embodiment of the present disclosure may be shown in FIG. 6, and includes the following operations.

Operation 601: Obtain size information of a current block.

It may be understood that different flags may correspond to different size-based constraints, and different size information may be used under different constraints. Therefore, based on different flags, different size information needs to be obtained. Therefore, the obtained size information may be a width of the current block, and/or a height of the current block, and/or an area of the current block (where the area may be specifically obtained based on the width and the height of the current block).

The width of the current block is denoted as W, the height of the current block is denoted as H, the area of the current block is denoted as sizeC, and sizeC=W×H. That is, the area of the current block is a product of the width of the current block and the height of the current block.

Operation 602: Determine a context model index ctxInc of a flag of the current block based on the obtained size information of the current block and the size-based constraint.

Specifically, based on different flags, there are different specific determining methods described as follows:

(1) Flag skip_flag

When an encoder side performs processing, if the area sizeC of the current block is less than a threshold th1, bidirectional prediction is not used for the current block. In a skip mode, a motion information candidate list needs to be constructed, and candidate information is obtained based on blocks whose locations are neighboring to the current block. However, there may be a block for which bidirectional prediction is used in the neighboring blocks. Therefore, to improve encoding efficiency, if the area sizeC of the current block is less than the threshold th1, the skip mode is not used, that is, a value of skip_flag is constrained to be 0. When the area sizeC of the current block is less than the threshold th1, bidirectional prediction is not used for the current block, and therefore a value of inter_dir is constrained not to be 2 on the encoder side. The threshold th1 is an integer greater than or equal to 32, for example, 32, 64, 128, or 256. In an implementation, a value of the threshold th1 is 64.

Therefore, in an implementation, if the area sizeC of the current block is less than the threshold th1, a value of the context model index ctxInc used by the flag skip_flag is 3. In an implementation, if the area sizeC of the current block is less than 64, the value of the context model index ctxInc used by the flag skip_flag is 3.

skip_flag is used to indicate whether the skip mode is used for the current block, skip_flag equal to 1 specifies that the skip mode is used for the current block, and skip_flag equal to 0 specifies that the skip mode is not used for the current block. In an implementation, skip_flag may be represented by cu_skip_flag.

(2) Flag inter_dir

Determining of the flag inter_dir is similar to determining of the flag skip_flag. In an implementation, if the area sizeC of the current block is less than the threshold th1, a value of the context model index ctxInc used by the flag inter_dir is 2. In an implementation, if the area sizeC of the current block is less than 64, the value of the context model index ctxInc used by the flag inter_dir is 2.

inter_dir indicates a prediction reference mode used by a current prediction unit. A value of InterDir is a value of inter_dir. If there is no inter_dir in the bitstream, the value of InterDir is 0. For example, a meaning of InterDir is as follows: if the value of InterDir is 0, the prediction reference mode is that a list 0 (PRED_List0) is used for reference, and a quantity of motion vectors of the prediction unit is 1; if the value of InterDir is 1, the prediction reference mode is that a list 1 (PRED_List1) is used for reference, and a quantity of motion vectors of the prediction unit is 1; if the value of InterDir is 2, the prediction reference mode is that a bi-prediction list (PRED_List01) is used for reference, and a quantity of motion vectors of the prediction unit is 2. In an implementation, inter_dir may alternatively be represented by inter_pred_ref_mode.

(3) Flag direct_flag

When the area sizeC of the current block is less than the threshold th1, bidirectional prediction is not used for the current block, and an allowed side length of a maximum TU is a threshold th2. Therefore, if the area sizeC of the current block is less than the threshold th1, or the width is greater than th2, or the height is greater than th2, it indicates that the current block is not allowed to be a TU. If a direct mode is used for the current block, it indicates that there is a residual after the current block is coded. To improve encoding efficiency, a value of direct_flag is restricted to be 0 on the encoder side. Therefore, the context model index ctxInc used by the flag direct_flag may be determined by using the following method. The threshold th2 is an integer greater than or equal to 32, for example, 32, 64, 128, or 256. In an implementation, the value of the threshold th2 is 64.

Therefore, in an implementation, if the area sizeC of the current block is less than the threshold th1, or the width is greater than the threshold th2, or the height is greater than the threshold th2, the value of the context model index ctxInc used by the flag direct_flag is 1. In an implementation, if the area sizeC of the current block is less than 64, or the width is greater than 64, or the height is greater than 64, the value of the context model index ctxInc used by the flag direct_flag is 1.

direct_flag is a flag of a direct mode. A value of direct_flag equal to 1 specifies that the direct mode is used for a current CU, and a value of direct_flag equal to 0 specifies that the direct mode is not used for the current CU.

(4) Flag pred_mode

Because a side length of a maximum TU allowed to be used for the current block is th3, if the width of the current block is greater than the threshold th3, or if the height of the current block is greater than the threshold th3, it indicates that an intra prediction mode is not suitable for the current block, and a value of the flag pred_mode is constrained to be 0 on the encoder side. In addition, if a side length of the current block is greater than th3, the current block does not become a TU, and there is no transform tree unit. Therefore, a value of a flag root_cbf may be constrained to be 0 on the encoder side. The threshold th3 is an integer greater than or equal to 16, for example, 16, 32, 64, 128, or 256. In an implementation, the value of the threshold th3 is 64.

Therefore, in an implementation, if the width of the current block is greater than the threshold th3, or the height of the current block is greater than the threshold th3, a value of the context model index ctxInc used by the pred_mode is 5. In an implementation, if the width of the current block is greater than 64, or the height of the current block is greater than 64, the value of the context model index ctxInc used by pred_mode is 5.

pred_mode is a prediction mode flag of a coding unit. A value of pred_mode equal to 1 specifies that intra prediction mode is used for a current prediction unit, and a value of pred_mode equal to 0 specifies that a regular inter prediction mode is used for the current prediction unit.

(5) Flag root_cbf

Determining of the flag root_cbf is similar to determining of the flag pred_mode. In an implementation, if the width of the current block is greater than the threshold th3, or the height of the current block is greater than the threshold th3, a value of the context model index ctxInc used by root_cbf is 1. In an implementation, if the width of the current block is greater than 64, or the height of the current block is greater than 64, the value of the context model index ctxInc used by root_cbf is 5.

The flag root_cbf is used to indicate whether there is a residual after the current CU is coded. A flag rqt_root_cbf in HEVC and a flag root_cbf in AVS3 are collectively referred to as a flag root_cbf in this specification. root_cbf equal to 1 specifies that there is a residual after the current block is coded, and that a coding syntax structure of a transform tree is used. root_cbf equal to 0 specifies that there is no residual after the current block is coded, and that the coding syntax structure of the transform tree is not used.

(6) Flag qt_split_flag

If a picture region in which the current block (a current node) is located is an I slice or an I frame, and the width and the height of the current block are both th4, a split mode QT is forcibly used for the current node. In this case, it is determined that a value of qt_split_flag is 1. th4 is a positive integer, for example, 64, 128, 256, or 512. In an implementation, the value of the threshold th4 is 128.

Therefore, in an implementation, if the picture region in which the current block is located is an I slice or an I frame, and the width of the current block is th4, it is determined that a value of the context model index ctxInc used by the flag qt_split_flag is 3. In an implementation, if the picture region in which the current block is located is an I slice or an I frame, and the width of the current block is 128, it is determined that a value of the context model index ctxInc used by the flag qt_split_flag is 3.

qt_split_flag is used to indicate whether a quadtree QT split is used for the current block. For example, a value of qt_split_flag equal to 1 specifies that the quadtree QT split is used for the current block, and a value of qt_split_flag equal to 0 specifies that the quadtree QT split is not used for the current block.

(7) Flag split_dir

If the width of the block corresponding to a current to-be-split node is a threshold th5, and the height of the block corresponding to the current to-be-split node is greater than the threshold th5, it is determined that a value of the context model index ctxInc used by the flag split_dir of the current block is 3. If the height of the block corresponding to a current to-be-split node is a threshold th5, and the width of the block corresponding to the current to-be-split node is greater than the threshold th5, it is determined that a value of the context model index ctxInc used by the flag split_dir of the current block is 4. The threshold th5 may be an integer greater than 16, for example, 32, 64, 128, or 256. In an implementation, the value of the threshold th5 is 64. For example, in an implementation, if the width of the block corresponding to the current to-be-split node is 64, and the height of the block corresponding to the current to-be-split node is 128, it is determined that the value of the context model index ctxInc used by the flag split_dir of the current block is 3. In another implementation, if the height of the block corresponding to the current to-be-split node is 64, and the width of the block corresponding to the current to-be-split node is 128, it is determined that the value of the context model index ctxInc used by the flag split_dir of the current block is 4.

split_dir is used to indicate a split direction of the current node. A value of split_dir equal to 1 specifies that a vertical split direction is used for the current node, and a value of split_dir equal to 0 specifies that a horizontal split direction is used for the current node.

Operation 603: Perform subsequent processing based on the context model index ctxInc of the flag of the current block.

The subsequent processing may be entropy encoding processing or entropy decoding processing.

skip_flag is used as an example. During entropy encoding processing, after a context model of a bin corresponding to the flag skip_flag is determined, a value of the bin may be encoded according to the context model, and information about whether the skip mode is used for the current block is written into a bitstream.

During entropy decoding processing, after the context model of the bin of the flag skip_flag is determined, a bitstream may be decoded according to the context model to obtain the value of the bin, and then a value of the skip_flag is determined based on the value of the bin, so as to determine whether the skip mode is used for the current block.

In comparison with a conventional technology that the value of the context model of the flag of the current block needs to be obtained based on availability of neighboring blocks (for example, a left block and an upper block) of the current block and a value of a corresponding flag, it can be learned from the foregoing that the value of the context model of the flag of the current block can be directly determined based on the size-based constraint in the embodiments of this application, thereby improving coding efficiency. Specifically, the solutions can be used to make a conditional probability of the flag to be maximally close to 0 or 1. Therefore, entropy coding efficiency is improved.

Table 3 lists some CU-level syntax structures. Some of the described flags are some syntax elements in Table 3, or may be syntax elements in a coding tree unit. The syntax elements are not listed herein. It should be noted that the flags in the table may be represented by using another method. For example, skip_flag may be represented as cu_skip_flag, and inter_dir may be represented as inter_pred_ref_mode. This is not specifically limited in the present disclosure, and details are not described subsequently.

TABLE 3

```
coding unit( x0, y0, uiDepth, uiWidth, uiHeight ) {
    . . .
    skip_flag
    . . .
    if ( ! skipFlag ) {
        direct_flag
        . . .
    }
    if ( ! directFlag )
        cu_pred_mode
    . . .
    if ( ! SkipFlag &&! DirectFlag ) {
        . . .
        if ( PictureType = = 2 )
            inter_dir
        . . .
    }
}
```

Figure 7:
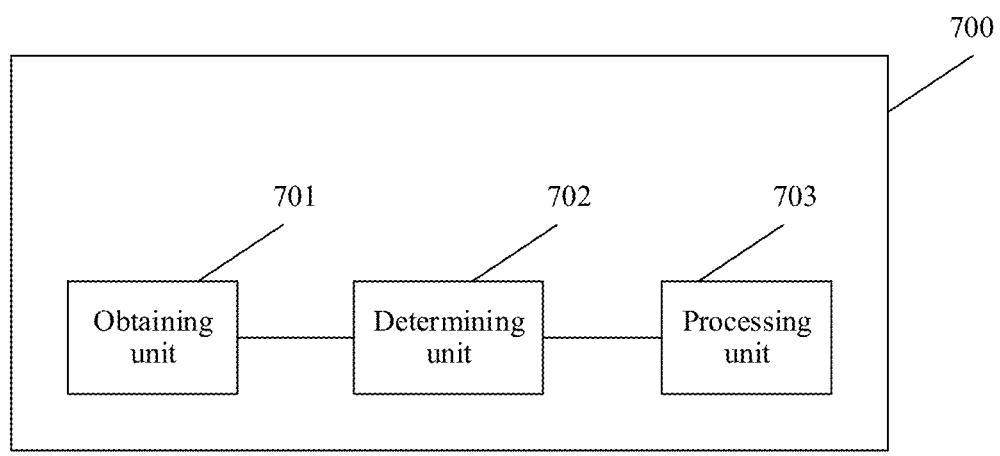
FIG. 7 is a structural block diagram of a processing apparatus for implementing an embodiment of the present disclosure.

Based on a same inventive concept as the foregoing method, the embodiments of the present disclosure further provide a processing apparatus 700 used in video encoding or video decoding. As shown in FIG. 7, the device 700 includes an obtaining unit 701, a determining unit 702, and a processing unit 703.

The obtaining unit 701 is configured to obtain size information of a current block.

The determining unit 702 is configured to determine a context model index ctxInc of a flag of the current block based on the obtained size information of the current block and a size-based constraint.

The processing unit 703 is configured to perform subsequent processing based on the context model index ctxInc of the flag of the current block.

In an implementation, when the flag of the current block is inter_dir, the size information, obtained by the obtaining unit 701, of the current block includes an area of the current block; and the determining unit 702 is further configured to: when the area sizeC of the current block is less than a threshold th1, determine that a value of the context model index ctxInc used by the flag skip_flag is 3.

In an implementation, when the flag of the current block is inter_dir, the size information, obtained by the obtaining unit 701, of the current block includes the area of the current block; and the determining unit 702 is further configured to: when the area sizeC of the current block is less than the threshold th1, determine that the value of the context model index ctxInc used by the flag inter_dir is 2.

In an implementation, if the flag of the current block is direct_flag, the size information, obtained by the obtaining unit 701, of the current block includes the area of the current block, or a width of the current block, or a height of the current block; and
the determining unit 702 is further configured to: when the area sizeC of the current block is less than the threshold th1, or the width of the current block is greater than a threshold th2, or the height of the current block is greater than a threshold th2, determine that the value of the context model index ctxInc used by the flag direct_flag is 1.

In an implementation, if the flag of the current block is pred_mode, the size information, obtained by the obtaining unit 701, of the current block includes the width of the current block or the height of the current block; and
the determining unit 702 is further configured to: when the width of the current block is greater than a threshold th3, or the height of the current block is greater than a threshold th3, determine that the value of the context model index ctxInc used by the flag pred_mode is 5.

In an implementation, if the flag of the current block is root_cbf, the size information, obtained by the obtaining unit 701, of the current block includes the width of the current block or the height of the current block; and
the determining unit 702 is further configured to: when the width of the current block is greater than the threshold th3, or the height of the current block is greater than the threshold th3, determine that the value of the context model index ctxInc used by the flag root_cbf is 1.

In an implementation, if the flag of the current block is qt_split_flag, the size information, obtained by the obtaining unit 701, of the current block includes the width of the current block and the height of the current block; and
the determining unit 702 is further configured to: when a picture region in which the current block is located is an I slice or an I frame, and the width of the current block is th4, determine that the value of the context model index ctxInc used by the flag qt_split_flag is 3.

In an implementation, if the flag of the current block is split_dir, the size information, obtained by the obtaining unit 701, of the current block includes the width of the current block and the height of the current block; and
the determining unit 702 is further configured to: when the width of the current block corresponding to a current to-be-split node is a threshold th5, and the height of the current block is greater than the threshold th5, determine that the value of the context model index ctxInc used by the flag split_dir is 3; or
when the height of the current block corresponding to a current to-be-split node is a threshold th5, and the width of the current block is greater than the threshold th5, determine that the value of the context model index ctxInc used by the flag split_dir is 4.

A person skilled in the art can understand that, the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or a communication medium including any medium that facilitates transfer of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

Instructions may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in the embodiments have respective focuses. For a part that is not described in detail in an embodiment, refer to related descriptions in other embodiments.

The foregoing descriptions are merely specific example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A processing method applied to video encoding or video decoding, wherein the method comprises:
   obtaining size information of a current block, the size information comprising an area of the current block;
   determining a context model index ctxInc of a flag of the current block based on the obtained size information of the current block and a size-based constraint, wherein the determining further comprises:
     responsive to determining that the flag of the current block is a skip_flag and the area of the current block is less than a threshold th1, determining that a value of the context model index ctxInc used by the flag skip_flag is 3, which indicates that the current block has a different prediction mode than a neighboring block, wherein the flag skip_flag is used to indicate whether a skip mode is used for the current block; and
   performing subsequent processing based on the context model index ctxInc of the flag of the current block.

2. The processing method according to claim 1, wherein the determining of the context model index ctxInc of the flag of the current block further comprises:
   if the flag of the current block is inter_dir, and an area of the current block is less than the threshold th1, determining that a value of the context model index ctxInc used by the flag inter_dir is 2, wherein the flag inter_dir is used to indicate a prediction reference mode used for the current block.

3. The processing method according to claim 1, wherein the determining of the context model index ctxInc of the flag of the current block further comprises:
   if the flag of the current block is direct_flag, and an area of the current block is less than a threshold th1, or a width of the current block is greater than a threshold th2, or a height of the current block is greater than the threshold th2, determining that a value of the context model index ctxInc used by the flag direct_flag is 1, wherein the obtained size information of the current block comprises the area of the current block, or the width of the current block, or the height of the current block, wherein the flag direct_flag is used to indicate whether a direct mode is used for the current block.

4. The processing method according to claim 1, wherein the determining of the context model index ctxInc of a flag of the current block further comprises:
   if the flag of the current block is pred_mode, and a width of the current block is greater than a threshold th3, or a height of the current block is greater than the threshold th3, determining that a value of the context model index ctxInc used by the flag pred_mode is 5, wherein the obtained size information of the current block comprises the width of the current block or the height of the current block, wherein the flag pred_mode is used to indicate whether an intra prediction mode is used for the current block.

5. The processing method according to claim 1, wherein the determining of the context model index ctxInc of a flag of the current block further comprises:
   if the flag of the current block is root_cbf, and a width of the current block is greater than a threshold th3, or a height of the current block is greater than the threshold th3, determining that a value of the context model index ctxInc used by the flag root_cbf is 1, wherein the obtained size information of the current block comprises the width of the current block or the height of the current block, wherein the flag root_cbf is used to indicate whether there is a residual after the current block is coded.

6. The processing method according to claim 1, wherein the determining of the context model index ctxInc of a flag of the current block further comprises:
if the flag of the current block is qt_split_flag, and a picture region in which the current block is located is an I slice or an I frame, and a width of the current block is th4, determining that a value of the context model index ctxInc used by the flag qt_split_flag is 3, wherein the obtained size information of the current block comprises the width of the current block and a height of the current block, wherein the flag qt_split_flag is used to indicate whether quadtree split is used for the current block.

7. The processing method according to claim 1, wherein the determining of the context model index ctxInc of a flag of the current block further comprises:
if the flag of the current block is split_dir, and a width of the current block corresponding to a current to-be-split node is a threshold thy, and a height of the current block is greater than the threshold th5, determining that a value of the context model index ctxInc used by the flag split_dir is 3; or
if the flag of the current block is split_dir, and a height of the current block corresponding to a current to-be-split node is the threshold th5, and a width of the current block is greater than the threshold th5, determining that the value of the context model index ctxInc used by the flag split_dir is 4, wherein the obtained size information of the current block comprises the width of the current block and the height of the current block, wherein the flag split_dir is used to indicate a split direction of the current block.

8. A processing apparatus used in video encoding or video decoding, comprising:
a memory; and
a processor coupled to the memory and configured to:
obtain size information of a current block, the size information comprising an area of the current block;
determine a context model index ctxInc of a flag of the current block based on the obtained size information of the current block and a size-based constraint, wherein the processor is configured to:
responsive to determining that the flag of the current block is a skip_flag and the area of the current block is less than a threshold th1, determine that a value of the context model index ctxInc used by the flag skip_flag is 3, which indicates that the current block has a different prediction mode than a neighboring block, wherein the flag skip_flag is used to indicate whether a skip mode is used for the current block; and
perform subsequent processing based on the context model index ctxInc of the flag of the current block.

9. The processing apparatus according to claim 8, wherein the processor is further to:
determine that a value of the context model index ctxInc used by a flag inter_dir is 2 when an area of the current block is less than the threshold th1 and the flag of the current block is inter_dir, wherein the flag inter_dir is used to indicate a prediction reference mode used for the current block.

10. The processing apparatus according to claim 8, wherein; wherein the processor is further to:
determine that a value of the context model index ctxInc used by a flag direct_flag is 1 when an area of the current block is less than the threshold th1, or a width of the current block is greater than a threshold th2, or a height of the current block is greater than the threshold th2, and when the flag of the current block is direct_flag, wherein the size information of the current block comprises the area of the current block, or the width of the current block, or the height of the current block, wherein the flag direct_flag is used to indicate whether a direct mode is used for the current block.

11. The processing apparatus according to claim 8, wherein the processor is further to:
determine that a value of the context model index ctxInc used by a flag pred_mode is 5 when a width of the current block is greater than a threshold th3, or a height of the current block is greater than the threshold th3, and when the flag of the current block is pred_mode, wherein the size information of the current block comprises the width of the current block or the height of the current block, wherein the flag pred_mode is used to indicate whether an intra prediction mode is used for the current block.

12. The processing apparatus according to claim 8, wherein the processor is further to:
determine that a value of the context model index ctxInc used by a flag root_cbf is 1 when a width of the current block is greater than a threshold th3, or a height of the current block is greater than the threshold th3, and when the flag of the current block is root_cbf, wherein the size information of the current block comprises the width of the current block or the height of the current block, wherein the flag root_cbf is used to indicate whether there is a residual after the current block is coded.

13. The processing apparatus according to claim 8, wherein the processor is further to:
determine that a value of the context model index ctxInc used by flag qt_split_flag is 3 when a picture region in which the current block is located is an I slice or an I frame, and a width of the current block is th4, and when the flag of the current block is qt_split_flag, wherein the size information of the current block comprises the width of the current block and a height of the current block, wherein the flag qt_split_flag is used to indicate whether quadtree split is used for the current block.

14. The processing apparatus according to claim 8, wherein the processor is further to:
determine that a value of the context model index ctxInc used by flag split_dir is 3 when a width of the current block corresponding to a current to-be-split node is a threshold th5, and a height of the current block is greater than the threshold th5, and when the flag of the current block is split_dir; or
determine that the value of the context model index ctxInc used by the flag split_dir is 4 when a height of the current block corresponding to a current to-be-split node is the threshold th5, and a width of the current block is greater than the threshold th5, and when the flag of the current block is split_dir, wherein the size information of the current block comprises the width of the current block and the height of the current block, wherein the flag split_dir is used to indicate a split direction of the current block.

15. A non-transitory computer-readable storage medium storing computer instructions, that when executed by one or more processors, cause the one or more processors to perform operations of:
- obtaining size information of a current block, the size information comprising an area of the current block;
- determining a context model index ctxInc of a flag of the current block based on the obtained size information of the current block and a size-based constraint, wherein the determining further comprises:
  - responsive to determining that the flag of the current block is a skip_flag and the area of the current block is less than a threshold th1, determining that a value of the context model index ctxInc used by the flag skip_flag is 3, which indicates that the current block has a different prediction mode than a neighboring block, wherein the flag skip_flag is used to indicate whether a skip mode is used for the current block; and
- performing subsequent processing based on the context model index ctxInc of the flag of the current block.

16. The non-transitory computer-readable storage medium of claim 15, wherein the determining a context model index ctxInc of a flag of the current block further comprises:
- if the flag of the current block is inter_dir and the area of the current block is less than the threshold th1, determining that the value of the context model index ctxInc used by the flag inter_dir is 2, wherein the obtained size information of the current block comprises the area of the current block, wherein the flag inter_dir is used to indicate a prediction reference mode used for the current block; or
- if the flag of the current block is direct_flag, and if the area of the current block is less than the threshold th1, or a width of the current block is greater than a threshold th2, or a height of the current block is greater than the threshold th2, determining that the value of the context model index ctxInc used by the flag direct_flag is 1, wherein the obtained size information of the current block comprises the area of the current block, or a width of the current block, or a height of the current block, wherein the flag direct_flag is used to indicate whether a direct mode is used for the current block.

17. The non-transitory computer-readable storage medium of claim 15, wherein the determining the context model index ctxInc of a flag of the current block further comprises:
- if the flag of the current block is pred_mode, and if a width of the current block is greater than a threshold th3, or a height of the current block is greater than the threshold th3, determining that a value of the context model index ctxInc used by the flag pred_mode is 5, wherein the obtained size information of the current block comprises the width of the current block or the height of the current block, wherein the flag pred_mode is used to indicate whether an intra prediction mode is used for the current block; or
- if the flag of the current block is root_cbf, and if a width of the current block is greater than the threshold th3, or a height of the current block is greater than the threshold th3, determining that the value of the context model index ctxInc used by the flag root_cbf is 1, wherein the obtained size information of the current block comprises the width of the current block or the height of the current block, wherein the flag root_cbf is used to indicate whether there is a residual after the current block is coded.

18. The non-transitory computer-readable storage medium of claim 15, wherein the determining the context model index ctxInc of a flag of the current block further comprises:
- if the flag of the current block is qt_split_flag, a picture region in which the current block is located is an I slice or an I frame, and a width of the current block is th4, determining that a value of the context model index ctxInc used by the flag qt_split_flag is 3, wherein the obtained size information of the current block comprises the width of the current block and a height of the current block, wherein the flag qt_split_flag is used to indicate whether quadtree split is used for the current block; or
- if the flag of the current block is split_dir, the width of the current block corresponding to a current to-be-split node is a threshold th5, and the height of the current block is greater than the threshold th5, determining that the value of the context model index ctxInc used by the flag split_dir is 3; or
- if the flag of the current block is split_dir, the height of the current block corresponding to a current to-be-split node is the threshold th5, and the width of the current block is greater than the threshold th5, determining that the value of the context model index ctxInc used by the flag split_dir is 4, wherein the obtained size information of the current block comprises the width of the current block and the height of the current block, wherein the flag split_dir is used to indicate a split direction of the current block.

* * * * *